June 7, 1966  G. F. LEAVER  3,255,017
POULTRY MEAT ROLL, TO BE STUFFED AND COOKED
Filed Sept. 23, 1963  2 Sheets-Sheet 1
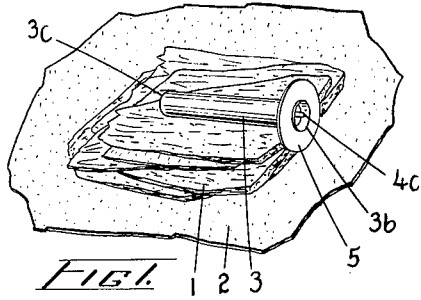
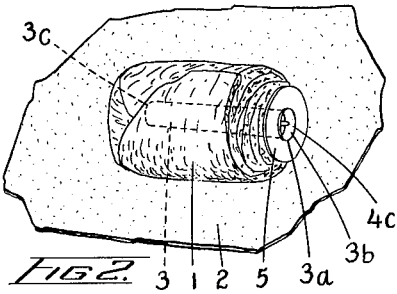
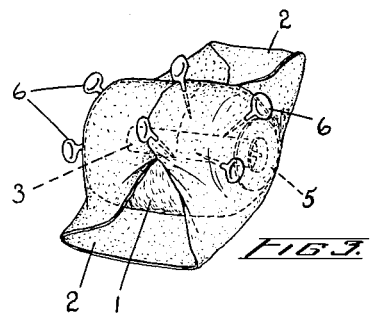
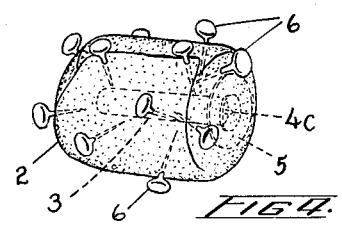
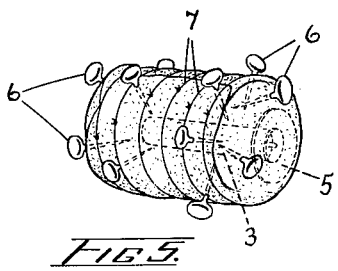
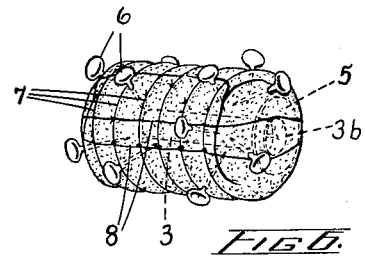
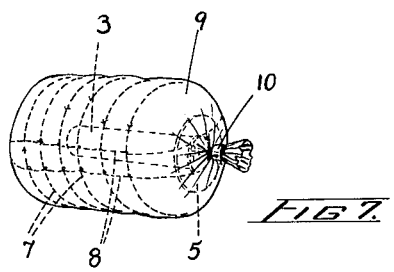
INVENTOR
GEORGE F. LEAVER
BY
*Maybee & Legris*
ATTORNEYS June 7, 1966 G. F. LEAVER 3,255,017
POULTRY MEAT ROLL, TO BE STUFFED AND COOKED
Filed Sept. 23, 1963 2 Sheets-Sheet 2
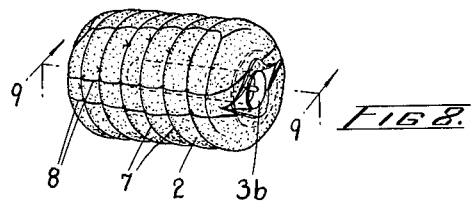
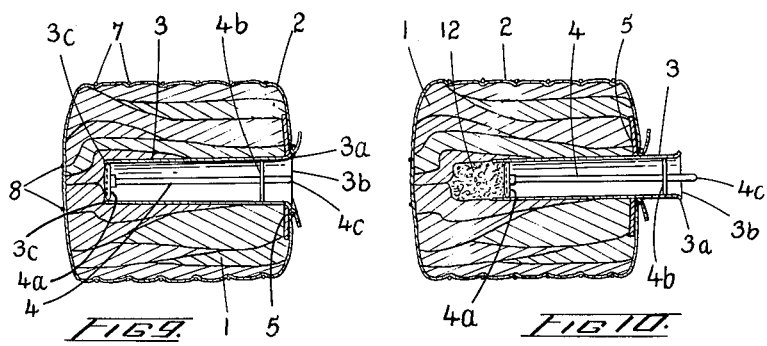
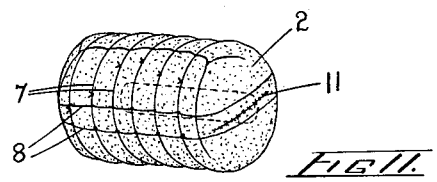
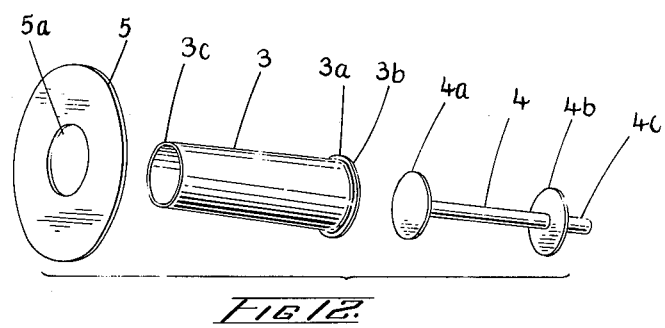
INVENTOR
GEORGE F. LEAVER
BY
*Maybee & Legris*
ATTORNEYS

# United States Patent Office 3,255,017
Patented June 7, 1966

3,255,017
POULTRY MEAT ROLL, TO BE STUFFED AND COOKED
George F. Leaver, 2190 Stanfield Road, Port Credit, Ontario, Canada
Filed Sept. 23, 1963, Ser. No. 310,548
Claims priority, application Canada, Aug. 24, 1963, 883,112
6 Claims. (Cl. 99—107)

This invention relates to a poultry meat roll that can be stuffed before cooking. Certain meats, and particularly poultry meats, are desirably cooked with stuffing. If meat is sold in a roll that has been securely tied, it is difficult to push stuffing into the roll, particularly if the meat has been frozen and is not completely thawed. It is not desirable for the meat packer to include stuffing in the roll, because the stuffing may spoil, and in any event many housewives prefer to use ingredients of their own choice in their stuffing.

It is an object of this invention to provide a poultry meat roll that can be relatively easily stuffed before cooking.

The invention is illustrated by way of example in the accompanying drawings in which:

FIG. 1 shows slices of turkey meat laid on a piece of turkey skin, and also shows an elongated tube around which the meat is to be wrapped;

FIG. 2 shows the meat slices wrapped around the tube to form a roll;

FIG. 3 shows portions of the skin wrapped over the ends of the roll and held by skewers;

FIG. 4 shows the rolled meat enveloped by the turkey skin;

FIG. 5 shows the roll secured by string wrapped around it;

FIG. 6 shows the roll further secured by string tied lengthwise of the roll;

FIG. 7 shows the tied roll enclosed within a waterproof bag and frozen;

FIG. 8 shows the roll unfrozen again, with the bag removed, and with the skin perforated for access to the tube;

FIG. 9 is a sectional view along a longitudinal plane indicated at 9—9 in FIG. 8;

FIG. 10 is a view similar to FIG. 9 and showing how the roll can be stuffed;

FIG. 11 shows the stuffed roll ready for cooking; and

FIG. 12 is an exploded view of the elongated tube and of a collar and plunger that can be assembled with the tube.

As shown in FIG. 1, slices of turkey meat 1 are laid on a piece of turkey skin 2, in order that the meat and skin can be wrapped around an elongated tube 3. The tube 3 can be of synthetic plastic or other rigid material that does not taint or otherwise adversely affect the meat. The tube is open at both ends, and, as best seen in FIGS. 10 and 12, it has a small, outwardly extending flange 3a around one end 3b. The tube tapers slightly from its flanged end 3b to its opposite end 3c. The ends of the tube can be closed, as best seen in FIG. 9, by inserting into the tube a plunger 4 having a head 4a at one end and a stopper 4b near the other end. The plunger is no longer than the tube 3, so that when the plunger is inserted in the tube, as in FIG. 1, it is housed within, and does not protrude from the tube, though its end 4c is accessible from the end 3b of the tube. A flexible washer 5 is placed over the tube and abuts against the flange 3a, as can be seen in FIG. 9 and FIG. 1. The washer 5 and plunger 4 are also of materials that do not affect the properties of the meat.

In FIG. 1, the tube 3 is arranged so that the meat slices 1 can be wrapped around the tube without obstructing the end 3b of the tube, the meat being wrapped behind the washer 5. The washer forms a collar that holds the meat away from the end 3b. The other end of the tube 3c is closed by the head 4a of the plunger. When the meat is wrapped around the tube, as shown in FIG. 2, the meat slices block the end 3c, as can best be seen in FIG. 9.

As shown in FIG. 3, portions of the skin 2 are first wrapped over the ends of the roll and held by skewers 6. Then the remainder of the skin is wrapped around the roll, over the first portions, as shown in FIG. 4, so that the skin completely envelops the roll. In FIG. 4 the skin 2 and skewers 6 secure the meat around the tube 3. The next step, as shown in FIG. 5, is to bind the meat and skin firmly by a number of strings 7 tied around the roll. Then, as shown in FIG. 6, a pair of strings 8 are run around the length of the roll, being tied to the strings 7. At the end 3b of the tube, these strings 8 hold the skin 2 at opposite edges of the tube 3. The skewers 6 are now removed and the roll is put in an airtight, waterproof, polyvinyl plastic bag 9 of the kind conventionally used to enclose poultry for freezing. The bag is closed by a metal clasp 10, and the roll is frozen in a brine tank or freezer, and it is kept frozen until it is purchased by a housewife.

The housewife allows the roll to thaw, and she removes the bag 9 and punctures or slits the skin 2 where it extends over the end 3b of the tube 3. The roll is now in the condition shown in FIGS. 8 and 9. The strings 8, being tight, tend to pull the skin away from the end 3b of the tube, but they hold the skin quite firmly against the washer 5, at opposite edges of the tube, thus holding the skin over the meat and restraining the meat against oozing out of the opening in the skin. Although the washer 5 is flexible, its central opening 5a is smaller than the flange 3a so that the flange holds the washer against the meat.

The housewife grasps the end 4c of the plunger and pulls the plunger out of the tube 3. Then, having made sutffing for the meat, she puts some of the stuffing into the tube through its accessible, uncovered end 3b, and she pushes the stuffing along the tube by means of the plunger 4. As shown in FIG. 10, the tube can gradually be withdrawn from the roll as the stuffing 12 is pushed in to take its place, the stuffing being discharged into the roll through the end 3c of the tube. The external taper of the tube facilitates its withdrawal, and if necessary, the tube can be grasped by its flange 3a. When the tube has been fully withdrawn, the flexible washer 5 is also pulled out of the opening in the skin, and this opening is then stitched shut, as shown at 11 in FIG. 11, the cavity formerly occupied by the tube 3 having been filled with stuffing. The stuffed roll can now be cooked.

It will thus be seen that the tube 3 provides a central elongated core that is slidable out of the meat roll to be replaced by stuffing without any substantial loosening of the strings 7 and 9 or of the skin 2 which secure the meat within them.

While slices of meat have been illustrated in the drawings, it will be understood that the roll may be made of a single piece of meat such as can be obtained by carefully cutting the meat away from the legs and breast of a turkey.

What I claim as my invention is:

1. A roll of poultry meat comprising a central elongated tube, uncooked poultry meat wrapped around the tube, poultry skin enveloping the meat and tube, string binding the enveloping skin and securing the meat around the tube, one end of the tube being open and uncovered by the meat at one end of the roll but covered by skin which can be cut to provide a temporary opening through which stuffing can be pushed into said one end of the tube, the other end of the tube being open but blocked by the meat at the other end of the roll, the tube being withdrawable longitudinally from said one end of the roll through such opening in the skin prior to cooking said roll of poultry meat, and said other open end of the tube being thus adapted to discharge into the roll stuffing pushed through the tube from said one end of the roll as the tube is withdrawn.

2. A roll of poultry meat as claimed in claim 1, wherein the tube has a flange at said one end, and a washer around the tube is held by the flange against the meat within the skin thus holding the meat away from said one end of the tube, the washer being flexible to facilitate its withdrawal through such opening in the skin.

3. A roll of poultry meat as claimed in claim 1, wherein a pair of lengths of said string hold the skin at opposite edges of said one end of the tube to retain the meat and skin in place despite the cutting of such opening in the skin between said lengths.

4. A roll of poultry meat as claimed in claim 1, including a plunger stored in the tube and withdrawable completely of the tube through said one end of the tube when such opening is cut in the skin, the plunger having a head for pushing stuffing into said one end of the tube, said head closing said other end of the tube when the plunger is stored in the tube, and the plunger having a stopper for closing said one end of the tube when the plunger is stored in the tube.

5. A roll of poultry meat as claimed in claim 1, wherein the tube is of synthetic plastic that does not adversely affect the meat and has an external taper from said one end of the tube to said other end of the tube to facilitate withdrawal of the tube from said one end of the roll.

6. A roll of poultry meat as claimed in claim 1 and enclosed within a waterproof bag and frozen.

References Cited by the Examiner

UNITED STATES PATENTS

| | | |
|---|---|---|
| 609,799 | 8/1898 | Flinn. |
| 1,409,463 | 3/1922 | O'Brien. |
| 1,917,137 | 7/1933 | Marchio. |
| 2,489,556 | 11/1949 | Blake. |
| 2,640,779 | 6/1953 | George _____ 99—107 |
| 2,779,681 | 1/1957 | Sell et al. _____ 99—107 X |
| 2,822,571 | 2/1958 | Johnson. |
| 2,876,100 | 3/1959 | Rogers et al. _____ 99—107 |
| 2,922,718 | 1/1960 | Saverslak _____ 99—107 |
| 2,937,092 | 5/1960 | Zitin _____ 99—107 |
| 2,937,095 | 5/1960 | Zitin _____ 99—107 X |

A. LOUIS MONACELL, *Primary Examiner.*

HYMAN LORD, *Examiner.*